UNITED STATES PATENT OFFICE.

KARL SCHICK, OF SIEGEN, GERMANY.

PROCESS OF MAKING CALCIUM CYANAMID.

1,008,927.

No Drawing.

Specification of Letters Patent. Patented Nov. 14, 1911.

Application filed June 1, 1911. Serial No. 630,665.

*To all whom it may concern:*

Be it known that I, KARL SCHICK, a subject of the King of Prussia, German Emperor, residing at Siegen, in the Province of Westphalia, Kingdom of Prussia, German Empire, have invented certain new and useful Processes of Making Calcium Cyanamid, of which the following is a specification.

As is already known, cyanamid or cyanid can be obtained by the reaction of nitrogen upon powdered carbid intermingled with powdered halogen salts. The admixture of the halogen salts in the carbid occasions in industrial working on the large scale a series of drawbacks. It is very difficult, for instance, to prepare powdered chlorids absolutely free from water. The slight quantities of moisture which are absorbed by calcium chlorid for instance during the pulverizing, decompose corresponding quantities of the carbid in the mixing machine, so that explosions may easily be occasioned by the liberated acetylene if it is not carefully displaced by inert gases. Moreover the mixing of the substances involves expenditure of labor, apparatus, repairs and motive power. Experiments have consequently been made in the view of avoiding this troublesome mixing process, firstly by directly adding the halogen salts to the material serving for the production of the carbid, and secondly by adding gradually and in corresponding quantities the halogen salts to the hot molten carbid as it flows from the furnace. The first plan of fusing the halogen salts together with the carbid in the furnace gave a serviceable result, but occasioned a number of troublesome effects in the production of the carbid. The second plan on the other hand resulted very satisfactorily because the halogen salts mingled intimately with the molten carbid even if they still contained a little moisture. The product obtained in this latter way needs only to be cooled so far that it becomes solid. If then, the still brightly red hot mass be put into a suitable pulverizing machine and treated therein immediately with nitrogen, then the nitrogen is eagerly absorbed with the well known reactions. In this manner there is obtained a product equal in value to that obtained by the process hitherto usual.

The technical and financial advantages of the new process are obvious. The subsequent mixing of the carbid with the halogen salts is avoided; these latter salts moreover do not need to be absolutely dry because the carbid flowing out of the carbid furnace is not decomposed by the moisture contained in the halogen salt at its high temperature. Further there is avoided as compared with the old process, the renewed heating of the carbid mixture, and finally the presence of the dangerous acetylene gas is avoided.

What I claim is—

The process of making calcium cyanamid from carbids and nitrogen by gradually adding to the molten carbid flowing out of the carbid furnace, predetermined quantities of halogen salts, then, after cooling until solid, pulverizing the mixture and treating it with nitrogen while still red hot.

In testimony, whereof I have signed my name to this specification in the presence of two subscribing witnesses.

KARL SCHICK.

Witnesses:
M. KNEPPERS,
GERTRUD BONA.